US007905808B2

United States Patent
Schwingshandl

(10) Patent No.: US 7,905,808 B2
(45) Date of Patent: Mar. 15, 2011

(54) HEAVY DUTY TRANSMISSION FOR BOWL-MILL ROLLER CRUSHERS

(75) Inventor: Frank Schwingshandl, Regensdorf (CH)

(73) Assignee: Maag Gear Systems AG, Winterthur (CH)

( * ) Notice: Subject to any disclaimer, the term of this patent is extended or adjusted under 35 U.S.C. 154(b) by 585 days.

(21) Appl. No.: 12/064,548

(22) PCT Filed: Aug. 10, 2006

(86) PCT No.: PCT/EP2006/065214
§ 371 (c)(1),
(2), (4) Date: Feb. 22, 2008

(87) PCT Pub. No.: WO2007/023100
PCT Pub. Date: Mar. 1, 2007

(65) Prior Publication Data
US 2008/0220925 A1     Sep. 11, 2008

(51) Int. Cl.
*F16H 37/04*     (2006.01)
(52) U.S. Cl. ........................................ 475/219; 475/207
(58) Field of Classification Search .................. 475/207, 475/219; 241/118, 285.1
See application file for complete search history.

(56) References Cited

U.S. PATENT DOCUMENTS

| | | | | |
|---|---|---|---|---|
| 3,339,853 | A | * | 9/1967 | Mischanski ................ 241/110 |
| 4,210,291 | A | * | 7/1980 | Kienast ...................... 241/110 |
| 4,471,671 | A | | 9/1984 | Sigg |
| 4,572,442 | A | | 2/1986 | Sigg |
| 5,616,098 | A | * | 4/1997 | Katayama et al. ............ 475/346 |
| 6,344,011 | B1 | | 2/2002 | Hosle |
| 6,368,244 | B1 | | 4/2002 | Hosle et al. |
| 6,401,561 | B1 | | 6/2002 | Hosle |

FOREIGN PATENT DOCUMENTS

| | | |
|---|---|---|
| CH | 694 244 A5 | 10/2004 |
| DE | 199 17 607 A1 | 11/2000 |
| DE | 199 17 609 A1 | 11/2000 |
| JP | 03 282 045 A | 12/1991 |

OTHER PUBLICATIONS

International Search Report and Written Opinion; International Application No. PCT/EP2006/065214; International filing date: Aug. 10, 2006.
International Preliminary Report on Patentability; International Application No. PCT/EP2006/065214; International Filing Date: Aug. 10, 2006.
Written Opinion; International Application No. PCT/EP2006/065214; International Filing Date: Aug. 10, 2006.

* cited by examiner

*Primary Examiner* — Ha D. Ho
(74) *Attorney, Agent, or Firm* — Antonelli, Terry, Stout & Kraus, LLP.

(57) ABSTRACT

A heavy-duty transmission for the drive of a bowl-mill roller crushers, comprising a bevel gear stage (6; 7), a horizontal input drive shaft (5) and a vertical output drive shaft (8) and a multi stage planetary gearbox arrangement which is connected to the vertical output drive shaft (8) by a sun pinion (9) and is connectable to the grinding bowl of the roller mill by an output flange (3). Planetary wheels (10) engageable into the sun pinion (9) are placed on a first plane on a planetary wheel support (14) which is connected to the output flange (3). On a second plane, other planetary wheels (15) are arranged in such a way than the axes of rotation thereof are connected to a gear housing (2) and which are engageable into a ring gear (20) connected to the support of the planetary wheels (14) and are engaged into the sun pinion (19) of an intermediate gear wheel (17), which is also provided with a ring wheel (18) which gearing from outside into the planetary wheels (10) on the first plane.

7 Claims, 1 Drawing Sheet

HEAVY DUTY TRANSMISSION FOR BOWL-MILL ROLLER CRUSHERS

RELATED APPLICATION

This application is a U.S. national phase application under 35 U.S.C. §371 of International Application No. PCT/EP2006/065214 filed Aug. 10, 2006 and claiming priority of European Application No. EP 05 018 323.5 filed Aug. 24, 2005.

TECHNICAL FIELD

The present invention relates to a heavy-duty transmission for the drive of bowl-mill roller crushers with a bevel gear stage having a horizontal drive shaft and vertical output shaft, and a multi-stage epicyclic transmission arrangement which is connected to the output shaft via a sun pinion and can be connected to the grinding bowl of the bowl-mill roller crusher via an output flange.

BACKGROUND OF THE INVENTION

For the drive of bowl-mill roller crushers with a grinding bowl rotating about a vertical axis use is made of heavy-duty transmissions which convert the rotational movement provided by a horizontally arranged driving motor into a vertical, slow rotation. Driving motors frequently used in this case are electric motors, the rotational speed of which has to be stepped down, for example in a ratio of 40:1.

Since drives of this type have to produce a high transmission of power at low rotational speeds, a bevel gear stage already bringing about a first stepping-down of the rotational speed is used for the deflection of the driving spindle. The rotational speed is then stepped down further in the vertical direction by a reduction stage, for example in the form of an epicyclic transmission or planetary transmission.

A heavy-duty transmission for the drive of grinding bowls situated vertically is known, for example, from CH 694 244. In this case, a bevel gear stage having a horizontal drive shaft is connected vertically to a multi-stage epicyclic transmission which finally drives the grinding bowl. The epicyclic transmission here is designed as a multistage planetary transmission with power division, in which power accumulated in the ring wheel toothing of the ring wheel body of the planetary transmission is output.

The object of the present invention is to find a heavy-duty transmission of this type which permits simple installation while having a compact construction.

This object is achieved according to the invention by a heavy-duty transmission of the invention as disclosed herein.

Further embodiments according to the invention emerge from the features of the invention described below.

A heavy-duty transmission is proposed for the drive of bowl-mill roller crushers with a bevel gear stage having a horizontal drive shaft and vertical output shaft and a multi-stage epicyclic transmission arrangement which is connected to the output shaft via a sun pinion and can be connected to the grinding bowl of the bowl-mill roller crusher via an output flange. According to the invention, in a first plane, planet wheels which engage in a meshing manner in the sun pinion are arranged on a planet carrier, wherein the planet carrier is connected to the output flange. Furthermore, further planet wheels, the rotational axles of which are connected to the transmission housing, are arranged in a second plane and engage firstly in a ring wheel connected to the planet carrier and engage secondly in a sun pinion of an intermediate wheel which has a further ring wheel which engages in a meshing manner from the outside in the planet wheels of the first plane.

A very compact transmission with power division is therefore proposed, in which the power firstly is transmitted directly into the output flange by the axles of the planet wheels via the planet carrier and secondly is transmitted into the output flange by a further planet stage via a ring wheel connected to the planet carrier. In addition, the mechanical construction of the transmission advantageously permits a simple installation and construction of the transmission in the transmission housing, since the individual components of the transmission can simply be inserted from above onto the location provided for them. Retrospective upkeep, repair and maintenance work to individual components of the transmission are therefore also facilitated, since, under some circumstances, it is not necessary for the entire epicyclic transmission to be removed and inserted in one piece. Furthermore, the compact construction of the transmission according to the invention means that the individual parts have a small size, as a result of which they can be produced more cost-effectively and are also easier to handle.

Three planet wheels, for example, are arranged in the first plane. The planet wheels are preferably arranged at a regular distance from one another, i.e. at an angle of 120° with respect to the longitudinal axis from one another.

At least three planet wheels, for example, are arranged in the second plane. The planet wheels are also preferably arranged here at a regular distance from one another, i.e. at an angle of 120° with respect to the longitudinal axis from one another.

The first plane, for example, is arranged above the second plane, said planes preferably being arranged one directly above the other. The power splitting and the arrangement of at least three planet wheels per stage result in a very compact construction of the transmission according to the invention. The power splitting results in a lower amount of power to be transmitted in the second stage, and therefore the latter can have smaller dimensions.

The planet carrier is designed, for example, as a ring wheel within which all of the further gearwheels of the epicyclic transmission arrangement are arranged. Firstly, the epicyclic transmission arrangement is therefore covered by the planet carrier as the radially outermost boundary and, secondly, the planet carrier can therefore simply be raised upwards out of the epicyclic transmission arrangement.

An exemplary embodiment of the present invention is explained in more detail below with reference to a figure.

DETAILED DESCRIPTION

Figure 1:
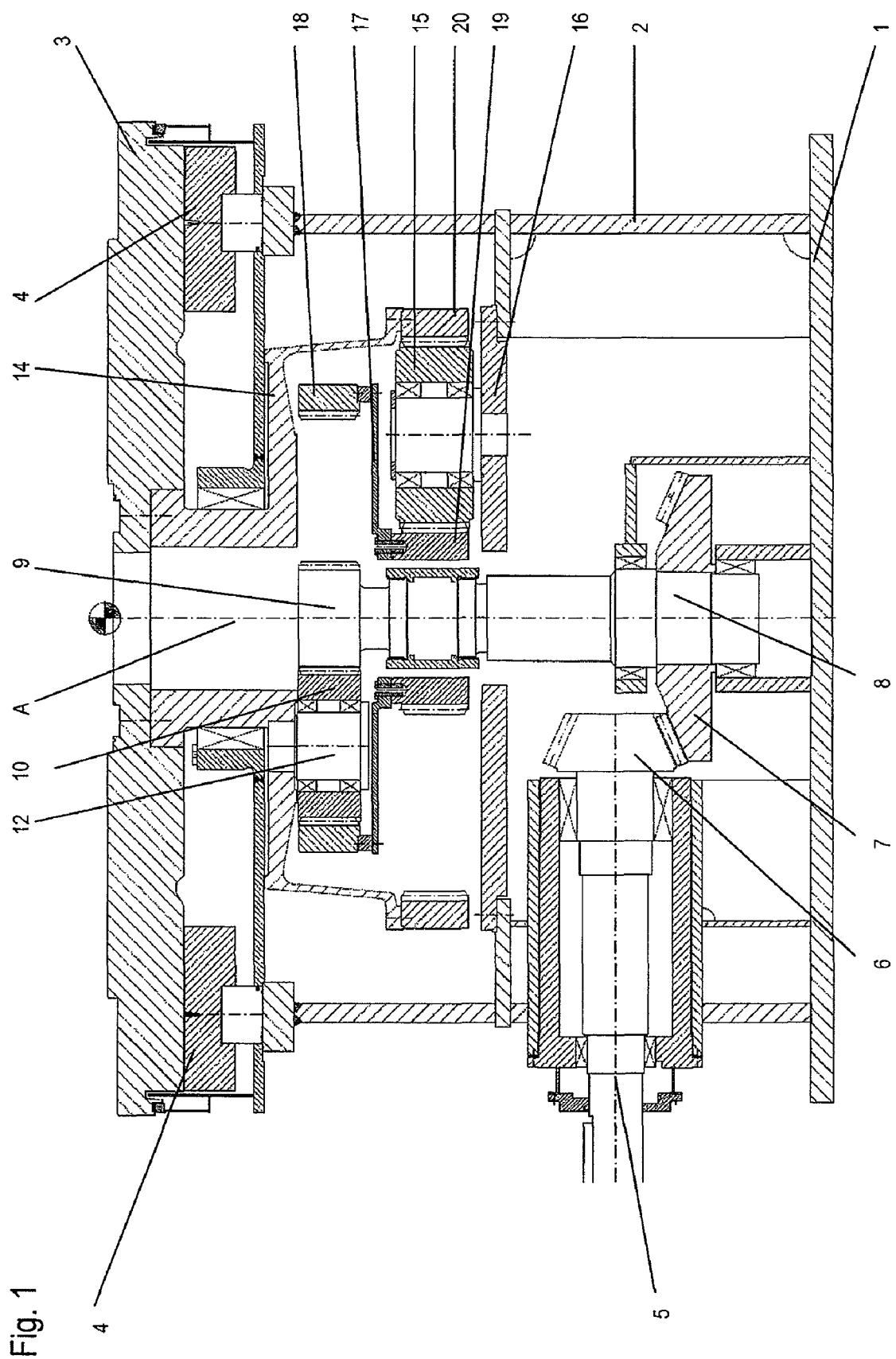
FIG. 1 shows, schematically, the longitudinal section through a transmission according to the invention.

FIG. 1 illustrates, schematically, the longitudinal section through a transmission according to the invention. The transmission has a base plate 1 with upwardly protruding housing walls 2 on which an output flange 3 is supported via bearings 4. The output flange 3 can be connected to a grinding bowl of s bowl-mill roller crusher (not illustrated for the sake of clarity)

For connection to a driving engine, there is a horizontally arranged drive shaft 5 which is provided on the head side with a bevel pinion 6. The bevel pinion 6 meshes in a bevel wheel 7 which is situated horizontally and has a vertical output shaft 8. The output shaft 8 is connected in a form-fitting manner axially to a sun pinion 9. This can take place, for example, by means of a shaft coupling, as illustrated in FIG. 1.

The sun pinion 9 meshes in a group of planet wheels 10 which are arranged such that they are situated in a central plane in the transmission. The planet wheels 10 are mounted in the planet carrier 14 via journals 12. Said planet carrier 14 is frictionally connected directly to the output flange 3.

A second group of planet wheels 15 is arranged in a second plane, here, for example, below the first plane having a group of planet wheels 10. Said planet wheels are arranged in a positionally fixed manner on a carrier 16 connected fixedly or releasably to the housing 2 of the transmission.

This second group of planet wheels 15 meshes in a ring wheel 17, which is connected to the planet carrier 14 or is formed thereon. The carrier 16, for example, can therefore be simply introduced from above into the housing 2 of the transmission and connected thereto, for example by means of screws. The planet wheels 15 may advantageously already be preassembled in the carrier 16.

An intermediate wheel 17 is arranged between the two groups of planet wheels 10 and 15, said intermediate wheel being rotatable freely about the vertical axis A of the transmission and having a ring wheel toothing 18, in which the planet wheels 10 of the first group mesh, and having a sun toothing 19 which engages in the planet wheels 15 of the second group. After the carrier 16 is fitted with the planet wheels 15, the intermediate wheel 17 can simply be introduced or placed from above into the transmission arrangement. Finally, the planet carrier 14 can likewise be placed from above over said arrangement and therefore the transmission can be completed.

Ultimately, the transmission arrangement can be dismantled again, advantageously into individual subassemblies, in a reverse sequence. Maintenance work can therefore be undertaken without, for example, the entire transmission arrangement having to be removed from or lifted out of the housing 2.

Power splitting of the operating power fed in via the drive shaft 5 is obtained by said arrangement. The power is output firstly directly into the planet carrier 14 via the journals 12 of the first group of planet wheels 10 and secondly into the planet carrier 14 by the second group of planet wheels 15 via the ring wheel 20.

This design of the transmission results in a very compact construction which is also simple to assemble and is likewise simple to disassemble for maintenance or upkeep or repair work

The invention claimed is:

1. A heavy-duty transmission for the drive of a bowl-mill roller crusher, comprising:
    a bevel gear stage having a horizontal drive shaft and a vertical output shaft;
    a multi-stage epicyclic transmission arrangement which is connected to the output shaft via a sun pinion and which can be connected to a grinding bowl of a bowl-mill roller crusher via an output flange;
    wherein a first plane, planet wheels which engage in a meshing manner in the sun pinion are arranged on a planet carrier;
    wherein the planet carrier is connected to the output flange;
    wherein further planet wheels, the axles of which are connected to a transmission housing, are arranged in a second plane, and which engage firstly in a ring wheel connected to the planet carrier and engage secondly in a sun pinion of an intermediate wheel which has a further ring wheel which engages in a meshing manner from the outside in the planet wheels of the first plane.

2. The heavy-duty transmission according to claim 1, wherein at least three planet wheels are arranged in the first plane.

3. The heavy-duty transmission according to claim 2, wherein at least three planet wheels are arranged in the second plane.

4. The heavy-duty transmission according to claim 1, wherein at least three planet wheels are arranged in the second plane.

5. The heavy-duty transmission according to claim 1, wherein the first plane is arranged above the second plane.

6. The heavy-duty transmission according to claim 1, wherein said planes are arranged one directly above the other.

7. The heavy-duty transmission according to claim 1, wherein the planet carrier is designed as a ring wheel within which all of further gearwheels of the epicyclic transmission arrangement are arranged.

* * * * *